H. PEYTON.
VEHICLE LAMP.
APPLICATION FILED JUNE 30, 1920.

1,420,741.

Patented June 27, 1922.

Inventor
Harry Peyton

By Whittemore Hulbert & Whittemore
Attorneys ced outer surface is then mirrored by applying the coating 7 of mirroring material, as by electro-plating, and the coating is polished, so that the light rays are deadened and at the same time dispersed at various angles not incident to the plain curved surface of the glass reflector member.

UNITED STATES PATENT OFFICE.

HARRY PEYTON, OF DETROIT, MICHIGAN.

VEHICLE LAMP.

1,420,741.

Specification of Letters Patent.  Patented June 27, 1922.

Application filed June 30, 1920. Serial No. 392,990.

*To all whom it may concern:*

Be it known that I, HARRY PEYTON, a citizen of the United States of America, residing at Detroit, in the county of Wayne and State of Michigan, have invented certain new and useful Improvements in Vehicle Lamps, of which the following is a specification, reference being had therein to the accompanying drawings.

The invention relates to vehicle lamps and more particularly to the reflectors thereof. The main object of the invention is the provision of a construction which will sufficiently illuminate the road in front of the vehicle without producing a glaring effect. Other objects of the invention reside in the novel features of construction as more fully hereinafter set forth.

Figure 1:
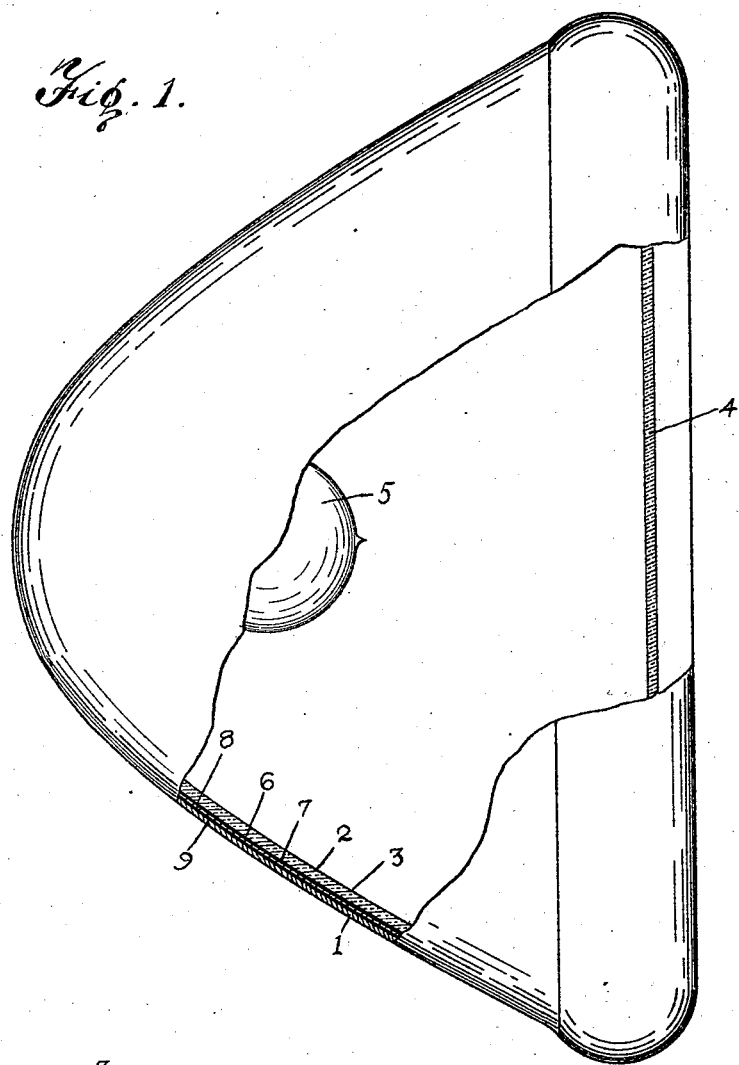
Figure 1 is a central sectional elevation of a vehicle lamp embodying my invention.
Figure 2:
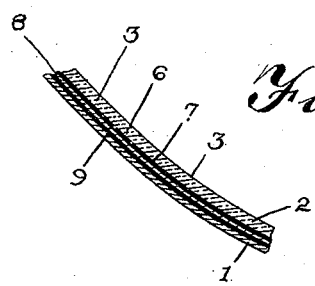
Figure 2 is an enlarged view of a portion thereof.

Heretofore vehicle lamps, having glass mirrors within their casings and plain lenses have been objectionable, due to the fact that they produced glaring light. With my construction comprising a glass mirror and a plain lens, the rays of light are diffused and dispersed, and do not produce a glare. In detail, the vehicle lamp has the casing 1, the glass reflector member 2 therewithin having an inner plane surface 3 and the plain lens 4 at the front of the casing 1. 5 is an electric light bulb within the reflector member. The outer surface 6 of the reflector member is frosted as by being rubbed with abrasive material such as pumice stone or etched with a suitable frosting acid for this purpose, the latter method being preferable. This frosted outer surface is then mirrored by applying the coating 7 of mirroring material, as by electro-plating, and the coating is polished, so that the light rays are deadened and at the same time dispersed at various angles not incident to the plain curved surface of the glass reflector member.

The depressions in the frosted surface of the reflector member are very fine and by varying the degree of frosting, the amount of light thrown from the vehicle lamp can be varied so that vehicle lamps may be readily formed having different reflecting powers.

To protect the coating 7 of mirroring material, coatings of shellac and paint 8 and 9 are successively applied.

What I claim as my invention is:

1. In a vehicle lamp, the combination with a reflector member having a finely roughened surface, of a mirroring material upon said roughened surface.

2. In a vehicle lamp, the combination with a reflector member having a frosted surface of electrolytically deposited mirroring material upon said frosted surface.

3. In a vehicle lamp, the combination with a glass member enclosing the light and having an outer frosted surface, of a coating of mirroring material upon said outer frosted surface, and means for protecting said coating of mirroring material.

4. In a vehicle lamp, the combination with a casing, of a glass member within said casing and having an outer frosted surface, and mirroring material upon said outer frosted surface.

In testimony whereof I affix my signature.

HARRY PEYTON.